(12) United States Patent
Larson

(10) Patent No.: US 8,477,177 B2
(45) Date of Patent: Jul. 2, 2013

(54) VIDEO CONFERENCE SYSTEM AND METHOD

(75) Inventor: Arnold W Larson, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1714 days.

(21) Appl. No.: 11/891,473

(22) Filed: Aug. 10, 2007

(65) Prior Publication Data

US 2009/0040288 A1 Feb. 12, 2009

(51) Int. Cl.
*H04N 7/14* (2006.01)

(52) U.S. Cl.
USPC ............................. 348/14.09; 348/14.01

(58) Field of Classification Search
USPC .................... 381/14.08, 14.09; 370/260–267;
348/14.01–14.09; 379/202.01; 709/204
See application file for complete search history.

(56) References Cited

U.S. PATENT DOCUMENTS

| | | | |
|---|---|---|---|
| 4,529,840 A | 7/1985 | Colton et al. | |
| 5,555,017 A | 9/1996 | Landante et al. | |
| 5,812,552 A | 9/1998 | Arora et al. | |
| 5,835,129 A | 11/1998 | Kumar | |
| 6,243,129 B1* | 6/2001 | Deierling | 725/105 |
| 6,310,879 B2 | 10/2001 | Zhou et al. | |
| 6,330,022 B1 | 12/2001 | Seligmann | |
| 6,624,841 B1* | 9/2003 | Buchner et al. | 348/14.1 |
| 7,034,860 B2* | 4/2006 | Lia et al. | 348/14.09 |
| 2005/0008240 A1 | 1/2005 | Banerji et al. | |
| 2005/0151836 A1 | 7/2005 | Ni | |
| 2005/0207433 A1 | 9/2005 | Ni | |
| 2005/0256925 A1 | 11/2005 | Luo et al. | |
| 2007/0263076 A1* | 11/2007 | Andrews et al. | 348/14.08 |
| 2007/0279483 A1* | 12/2007 | Beers et al. | 348/14.08 |
| 2008/0246834 A1* | 10/2008 | Lunde et al. | 348/14.09 |

FOREIGN PATENT DOCUMENTS

EP 1 207 694 5/2002

* cited by examiner

*Primary Examiner* — Curtis Kuntz
*Assistant Examiner* — Sunita Joshi

(57) ABSTRACT

Various embodiments of a video conference system and method are disclosed.

22 Claims, 5 Drawing Sheets

VIDEO CONFERENCE SYSTEM AND METHOD

BACKGROUND

This disclosure relates generally to video conferencing systems. Video conference systems that use specially-configured video conference studios have been developed to provide the look and feel of a face-to-face conference. Such systems can include a pair (or more) of specially-configured video conference studios that each include seating places for multiple persons facing one or more video conference displays. One or more video conference cameras take images of the persons in each room, and provide the respective images to corresponding video displays in the other video conference studios, wherever they are located.

In this type of video conference arrangement, the participants can see and hear the other participants as if they were all together in the same room. With the video conference cameras properly oriented and a suitable background in each conference room, this configuration can provide a blended video conference environment that approximates the appearance of a face-to-face conference session.

When such a video conference is established between two specialized video conference studios, it can be difficult to include one or more participants that are located at a third location, and who may not be in a specialized video conference studio. For example, in a two-way video conference between specially-configured video conference studios, it can be desirable to insert a view of someone at a third location. With some current studio configurations this is not easy to do while still maintaining a blended look to the video conference.

BRIEF DESCRIPTION OF THE DRAWINGS

Various features and advantages of the present disclosure will be apparent from the detailed description which follows, taken in conjunction with the accompanying drawings, which together illustrate, by way of example, features of the present disclosure, and wherein.

DETAILED DESCRIPTION

Figure 1:
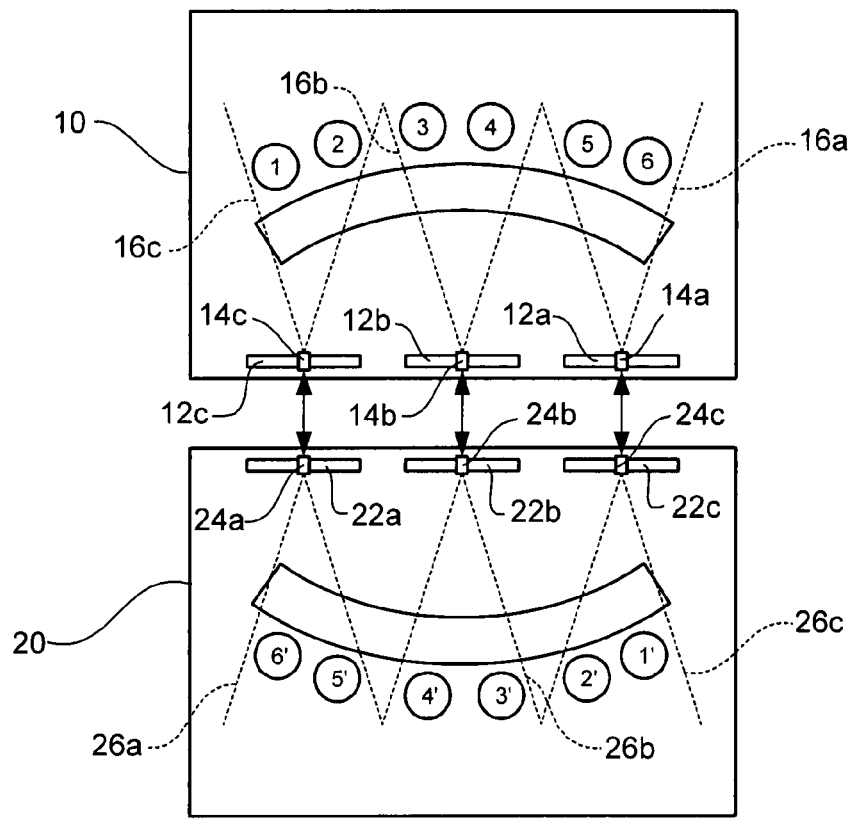
FIG. 1 is a diagram of a pair of specially-configured video conference studios interconnected in a two-point video conference.

Reference will now be made to exemplary embodiments illustrated in the drawings, and specific language will be used herein to describe the same. It will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure.

As noted above, video conference systems that use specially-configured video conference studios have been developed to provide the look and feel of a face-to-face conference. As used herein, the terms "studio," "room" and "environment" are used interchangeably to refer to any location or environment which serves as an endpoint for a video conference. The actual environment can be anything from a fully or partially enclosed room, to a cubicle, a kiosk, or even a temporary structure such as a tent, or any other environment which can include the equipment needed for a video conference, and which provides a position for at least one video conference participant.

A specially-configured video conference system that is intended to provide the look and feel of a face-to-face conference is shown in FIG. 1. A first specially-configured video conference studio 10 includes seating places for persons 1 through 6 facing video displays 12*a-c*. Video cameras 14*a-c* take images of each two adjacent persons, as designated by the video camera view ranges shown as outlines at 16*a-c*. The video cameras and displays in the first video conference studio communicate with corresponding video displays 22 and cameras 24 in a second video conference studio 20 at a remote location. The cameras 24*a-c* in that studio likewise take images of each two adjacent participants 1'-6', as indicated by video camera view ranges 26*a-c*.

Figure 3:
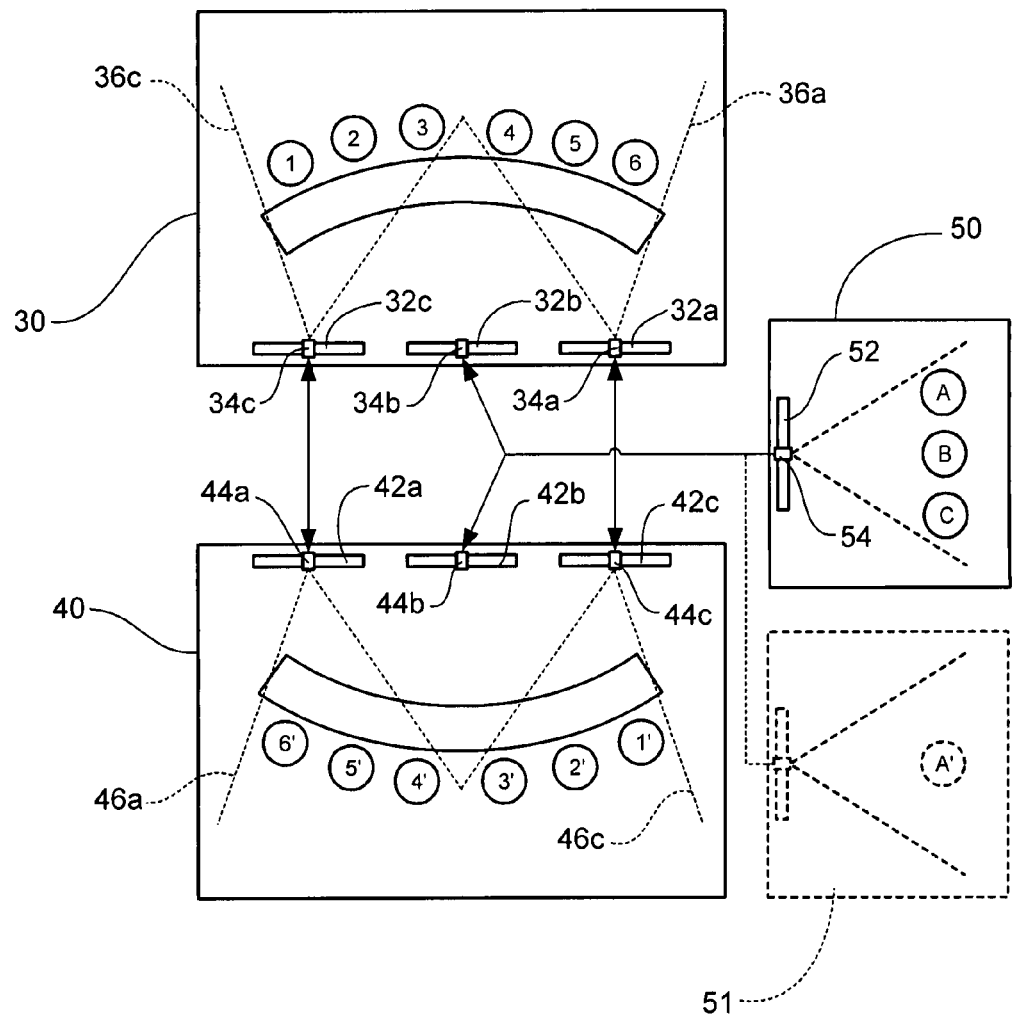
FIG. 3 is a diagram of one embodiment of a pair of specially-configured video conference studios interconnected in a video conference, with third and fourth point views inserted into the conference.
Figure 5:
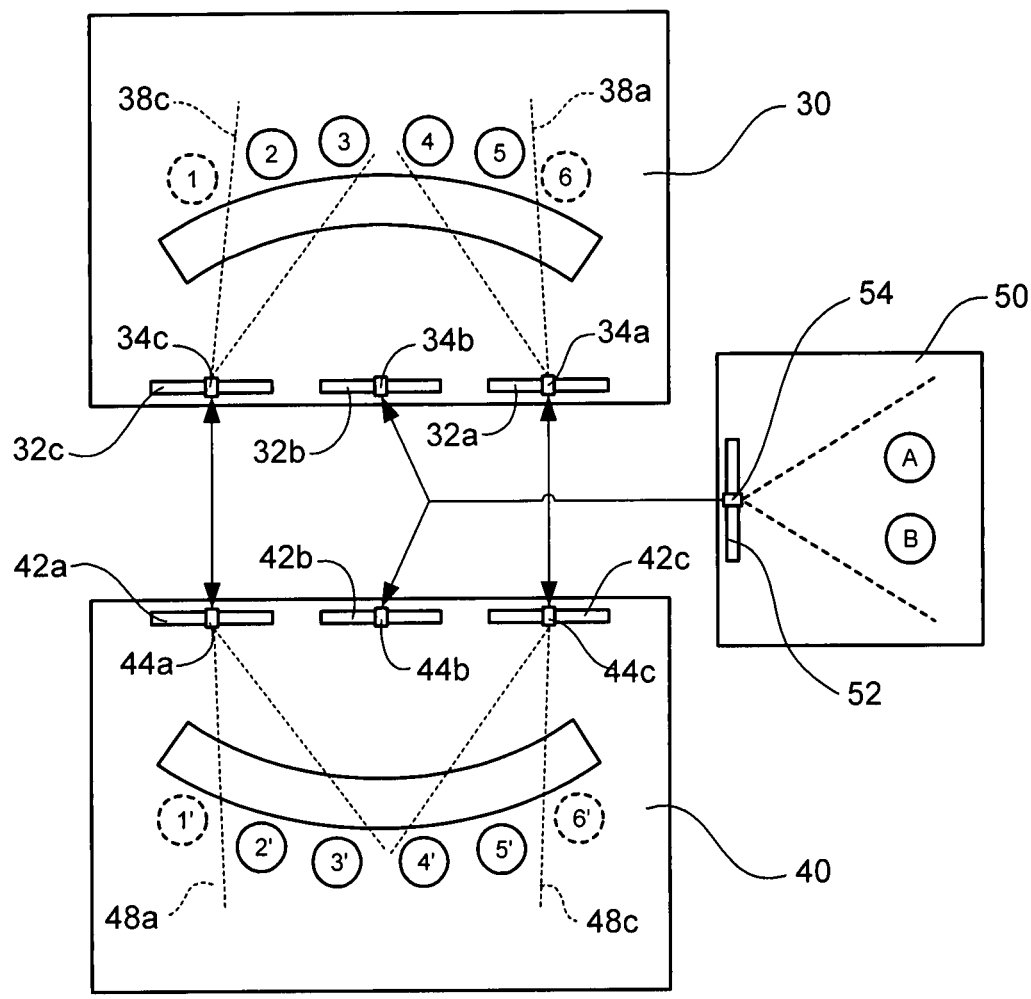
FIG. 5 is a diagram of another embodiment of a pair of specially-configured video conference studios interconnected in a video conference, with a third point view inserted into the conference.

The connections between the cameras and displays of the video conference environments shown in FIGS. 1, 3 and 5 are depicted as arrows which represent functional connections, not actual structural connections. These lines are not intended to suggest a single direct link (hard-wired or otherwise) between a particular set of cameras and displays. Those of skill in the art will recognize that the cameras and displays in one video conference environment are usually connected to a local computer system or network that is in turn connected to a communications system (e.g. the Internet) that links the first computer system or network (whether directly or indirectly) to a second computer system or network at a remote location where the second video conference environment is located. It is to be appreciated that there are various ways in which such remote video conference connections can be configured, and those of skill in the art are presumed to be aware of the details of such arrangements.

Figure 2:
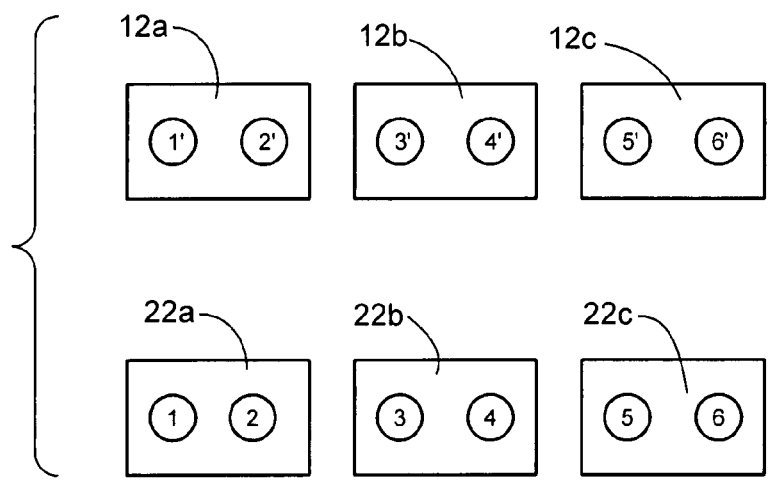
FIG. 2 depicts the video display images of the respective video conference studios of FIG. 1.

In the type of video conference arrangement shown in FIG. 1, the participants will see the displays as shown in FIG. 2. That is, for the participants in the first video conference studio 10, display 12*a* will show participants 1' and 2', display 12*b* will show participants 3' and 4', and display 12*c* will show participants 5' and 6'. Similarly, in the second studio 20 display 22*a* will show participants 1 and 2, display 22*b* will show participants 3 and 4, and display 22*c* will show participants 5 and 6. This configuration provides a blended video conference environment that provides the illusion of eye contact and gaze awareness that approximates a face-to-face conference session. The specialized video conference studios can be configured with similar backgrounds and have displays sized and positioned to give the appearance of a face-to-face conference, as if all participants were in the same room surrounding a single conference table. This type of blended video conference environment that provides the illusion of eye contact and gaze awareness normally associated with a face-to-face conference session can be referred to as a "remote presence" video conference environment. Various aspects of event topology and blended space in video conference systems that allow a remote presence video conference are disclosed in U.S. patent application Ser. No. 11/497,886, filed Aug. 2, 2006 and entitled "System And Method For Managing Virtual Collaboration Systems," and U.S. patent application Ser. No. 11/559348 entitled "Blended Space For Aligning Video Streams," filed Nov. 13, 2006, the disclosures of which are incorporated herein by reference in their entireties.

In this type of system it can be difficult to include one or more participants that are located at a third location who are not also in a specialized video conference studio. For example, in a two-way video conference between specially-configured video conference studios as depicted in FIG. 1 it can be desirable to insert a view of someone from a third location. With some current studio configurations this is not easy to do while still maintaining a blended look to the video conference. For example, people can be present in a specialized video conference studio that is an endpoint of a multi-point meeting and still not be full participants if the video conference cameras do not cover the chairs at the end of the line. Multipoint video conference configurations can be limited in the size and/or number of participants they can handle where one camera must cover all the participants.

One possible approach for joining three video conference studios is to use the same configuration as for a 4 point meeting, with the display corresponding to the fourth endpoint being black (e.g. having a fixed view of empty chairs). One configuration that has been used for a 4-point conference includes four remote presence video conference studios, each having three cameras and three displays. Each of the three displays in each room show a view of each of the other three video conference studios, each view being taken by one of the three cameras in the other rooms. With this arrangement, the camera views and displays can provide something like the appearance that the participants in all four rooms are seated around a single round table. A three-way conference using this 4-point arrangement could be created by simply leaving one of the displays blank in each room, and not taking an image with the corresponding camera. However, since each display view is taken by a single camera, in order to have larger size images of persons in the opposing rooms, this approach can limit the view range for some of the studios, and any people seated beyond the view of the camera will be heard but not seen at the other endpoints. Alternatively, the views of the other participants will be of small size. Another possible approach is to provide the video feed from the third endpoint on a collaboration display or other secondary display located elsewhere in the first and second conference rooms. However, this approach hinders the look and feel of a face-to-face conference session.

The inventor has devised an alternate configuration for a multipoint video conference that allows a two-point conference to be expanded to add a third endpoint, such that more of the participants can be included at a larger size while still maintaining the blended environment for the participants in the studio. The third endpoint can be another remote presence video conference environment, or it can be some other video conference environment. This approach allows a single camera view to be added to an existing video conference meeting between two specialized video conference studios.

One embodiment of this type of configuration is shown in FIG. 3. This configuration involves participants in two specialized studios 30, 40 and a third video conference endpoint 50 that is linked to the first two. The third endpoint can be a specialized remote presence studio, or it can be a freestanding video conference environment of some other type. Many approaches can be taken to make the third endpoint blend in well with the first two, if desired. For example, the third video conference environment can include a backdrop that looks like the backdrop in the specialized studios. Each studio includes displays 32, 42, 52, and cameras 34, 44, 54, in a configuration like those shown in FIG. 1. This allows the participants in at least the first two video conference environments to experience the blended environment, eye contact, and gaze awareness of a typical meeting between two specialized video conference environments.

Each camera 34, 44 in the specialized studios 30 and 40 can include a pan-tilt-roll mechanism that allows the directional orientation of the camera to be changed. Likewise, the cameras can have an adjustable zoom feature. The pan-tilt-roll mechanism can be mechanical or it can be a digital electronic system. Likewise, the zoom can be digital. In the embodiment of FIG. 3, only the two outside cameras 34a, 34c, 44a, 44c are used in the specialized studios. To encompass all six seats the outside cameras are rotated to the appropriate orientation and zoomed out to each include 3 people in the field of view. In the first specialized video conference environment, the rotated and zoomed fields of view are indicated by dashed lines 36a and 36c. In the second specialized video conference environment, the rotated and zoomed fields of view are indicated by dashed lines 46a and 46c. The views provided by these cameras at the rotated and zoomed positions are transmitted to the outside displays 32a, 32c, 42a and 42c, respectively, in the other specialized video conference studio.

Figure 4A:
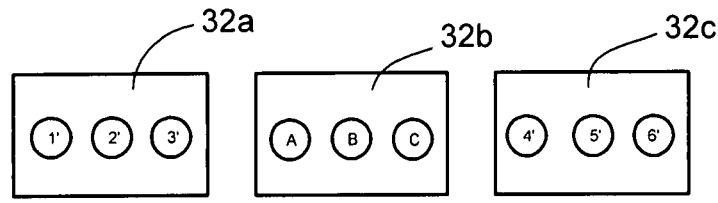
FIGS. 4A-4C depict the video display images of the respective video conference studios of FIG. 3.
Figure 4B:
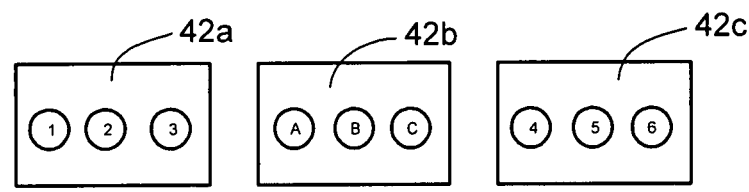

The camera 54 in the third conference room 50 takes an image of persons A, B and C. This image is transmitted to the center displays 32b and 42b in the first two video conference rooms. Referring to FIGS. 4A and 4B, with this approach, the outside displays 32a, 32c, 42a and 42c in the specialized video conference studios will each show three of the six participants in the respective video conference studios 30, 40, though at reduced size (compared to the typical unzoomed camera field of view for the video conference cameras). At the same time, the center displays 32b and 42b will show the three participants A, B and C that are in the third video conference room 50.

Figure 4C:
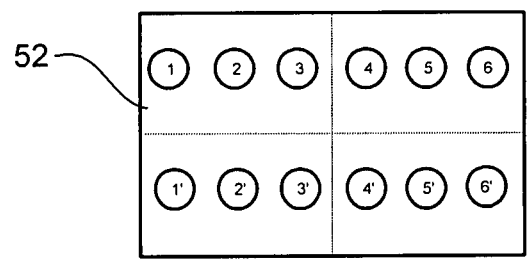

The third video conference room 50 also has a display 52, and indeed can have more than one display, if desired. If the third endpoint is a specialized video conference studio like the first two, it can already have the right background and the required camera. The third endpoint can have a variety of options for displaying images from the studio cameras. For example, the third endpoint can selectively display the images from the outside cameras 34a, 34c, 44a and 44c, the same images as are displayed in each of the other specialized video conference rooms, or it can use a wide view from the center cameras 34b and 44b in those rooms, which are not being otherwise used. Alternatively, the third display 52 can be configured to simultaneously show all six participants from each of the other video conference rooms in a split screen format, as shown in FIG. 4C.

The configuration depicted in FIGS. 3 and 4 allows the people from the third endpoint 50 to be inserted into the existing video conference meeting together with all participants in the meeting at the other two locations (e.g. 6 people in each of the specialized video conference studios 30, 40). While the images of the participants are reduced in size compared to the images provided in the configuration of FIG. 1, the meeting will still include all participants and generally preserve the appearance of an in-person conference, at least between the first and second specialized video conference rooms.

Another aspect of this system and method is the ability to insert more than one additional video conference link into the 2-point video conference system. One embodiment of this approach is also shown in FIG. 3, wherein a fourth video conference environment 51 (shown in dashed lines) can be interconnected with the first and second remote presence video conference environments 10, 20 in the same manner as the third video conference environment 50. This allows an additional participant A' to be brought in from some other location. Any number of additional video conference environments can be interconnected in this manner. The video images from the third and fourth video conference environments can be displayed on the same screen in each of the first and second video conference studios, such as using a split screen arrangement. Other alternatives are also possible. This allows multiple additional participants to be inserted into a 2-point video conference session.

An alternative to the reduced size images that are displayed when two cameras are used to encompass all participants in the specialized conference rooms is shown in an alternative embodiment depicted in FIGS. 5 and 6. In this configuration, the view range of the two outer cameras 32a, 32c and 42a, 42c in the first two video conference rooms can be set so that each camera encompass two participant locations in each specialized video conference studio 30, 40. In the first specialized video conference environment, the rotated and fields of view are indicated by dashed lines 38a and 38c. In the second specialized video conference environment, the rotated fields of view are indicated by dashed lines 48a and 48c. This configuration allows the views to be full size, though only four out of six seats (seats 2-5) are within the field of view. In the embodiment shown in FIG. 5 the third video conference room 50 is configured for two people A and B, though it can be configured differently.

Figure 6A:
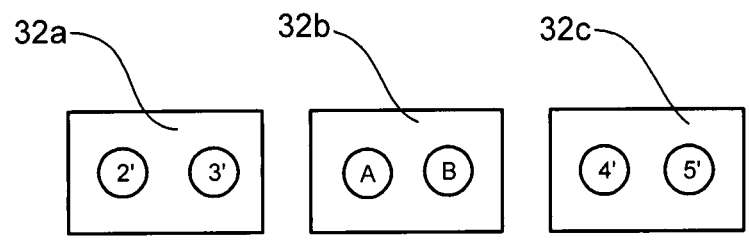
FIGS. 6A-6B depict the video display images of the respective video conference studios of FIG. 5.
Figure 6B:
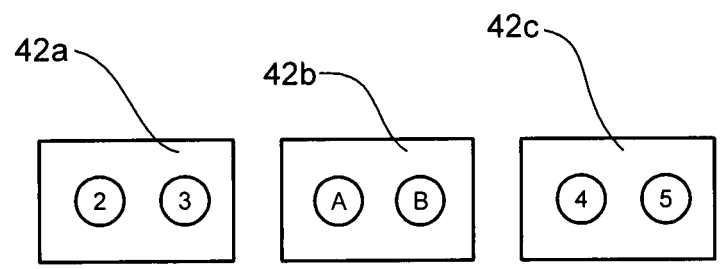

When the video conference is arranged in this way, the participants in the first specialized video conference studio 30 will see the displays as shown in FIG. 6A, with participants 2' and 3' appearing full size on the left hand display 32a, participants 4' and 5' appearing full size on the right hand display 32c, and the third point participants A and B appearing full size on the center display 32b. Similarly, the participants in the second specialized video conference studio 40 will see the displays as shown in FIG. 6B, with participants 2 and 3 appearing full size on the left hand display 42a, participants 4 and 5 appearing full size on the right hand display 42c, and the third point participants A and B appearing full size on the center display 42b. This configuration allows the display images of the participants to be full size and thus maintains the look and feel of a face-to-face conference session, though fewer participants are included.

Other alternative arrangements are also possible. For example, the third view (from the third video conference studio) can be displayed on one of the displays on the side (i.e. right or left), rather than the center display. As another alternative, views from more than one additional site (e.g. a 3d and fourth site (or more)) can be inserted and composited on one display screen in order to allow the first and second views to remain at the larger size. This is just one example of many ways the third (or more) endpoint insertion method outlined herein can be used to emphasize or de-emphasize selected video conference views. By selecting the placement (e.g. left, right, center) and size of the inserted view, users of this system and method can control the prominence of the various video conference views.

This video conference system thus provides a method for inserting a single endpoint video conference view (or multiple additional endpoint views) into an established 2-way video conference between two specialized video conference environments that are configured to create the illusion of eye contact and presence between remote participants. It provides an alternative method to include one or more freestanding teleconference systems into a video conference studio meeting that maintains the blended environment better than including it on a collaboration display or other secondary display. It can allow the addition of one or more people at a single endpoint into a video conference meeting with all other people in the meeting in two other locations. It also allows the selective control of prominence of the video conference views from the two specialized video conference studios, and from the additional inserted endpoint(s). The embodiments of FIGS. 3 and 5 also provide the additional benefit that using just two cameras instead of three allows for reduced bandwidth of data over the video conference link, thus allowing for the addition of the remote video presence data within the video conference link without using additional bandwidth compared to conventional sessions.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims.

What is claimed is:

1. A video conference system, comprising:
a first remote presence video conference environment for establishing a remote presence video conference with a second remote presence video conference environment, each environment including a plurality of cameras, oriented to view a plurality of participant positions, and a plurality of displays;
said first remote presence video conference environment having at least two operating modes;
a first operating mode, in which, among said plurality of cameras, said plurality of participant positions are imaged and a signal from each camera is transmitted to a corresponding display in said second remote presence video conference environment, said first operating mode further comprising receiving signals from said second remote presence video conference environment, signals from said second remote presence video conference environment being output by said displays in said first remote presence video conference environment;
a second operating mode, in which, one of said cameras is deactivated and at least one remaining camera of said plurality of cameras is reoriented so as to image more of said plurality of participant positions than in said first operating mode, said second operating mode receiving a signal from a camera in, a third video conference environment, wherein said signal from said third video conference environment is output by a display in said first remote presence video conference environment that would otherwise receive a signal coming from a camera in said second remote presence video conference environment.

2. A video conference system in accordance with claim 1, wherein the third environment comprises a remote presence video conference environment.

3. A video conference system in accordance with claim 1, further comprising a fourth video conference environment, interconnected to provide a video image to the display on which the video image from the third video conference environment appears in each of the first and second environments.

4. A video conference system in accordance with claim 1, wherein the third video conference environment includes a display that receives an image taken from a camera in each of the first and second remote presence video conference environments.

5. A video conference system in accordance with claim 4, wherein the third video conference environment includes a display that provides a composite of images from all operating cameras in the first and second remote presence video conference environments.

6. A video conference system in accordance with claim 1, wherein the cameras in the first and second remote presence video conference environments are adjusted to view less than all of the participant positions.

7. A video conference system in accordance with claim 1, wherein less than all of the cameras in the first and second remote presence video conference environments are adjusted to view all of the participant positions.

8. A video conference system in accordance with claim 1, wherein the plurality of cameras comprise three cameras and the plurality of displays comprise three displays, two of the cameras and two of the displays being interconnected to send and receive video images from the opposite remote presence environment.

9. A video conference system in accordance with claim 8, wherein the three displays are located at right, left and center positions, the center display being configured to receive the video image from the third video conference environment.

10. A video conference system in accordance with claim 8, wherein the three displays are located at right, left and center positions, one of the right and left displays being configured to receive the video image from the third video conference environment.

11. A video conference method, comprising the steps of:
interconnecting first and second remote presence video conference environments, each environment including a plurality of participant positions, cameras, and displays, wherein each camera in each environment corresponds to a display in the other of said environments;
adjusting the cameras such that, without using a first of the cameras at the first of said video conference environments, all of the participant positions at that first video conference environment that are occupied are imaged by remaining cameras at the first video conference environment;
displaying an image from each of said cameras on a corresponding display at the second video conference environment; and
providing video from a third video conference environment that is displayed on a display in the second video conference environment that corresponds to the first camera in the first video conference environment.

12. A method in accordance with claim 11, further comprising the step of providing images to a display in the third environment from said first camera in the first remote presence video conference environment.

13. A method in accordance with claim 12, wherein the step of providing images to the display in the third environment comprises providing a composite of images from all operating cameras in the first and second remote presence video conference environments.

14. A method in accordance with claim 11, wherein the step of adjusting the cameras comprises adjusting the cameras to view less than all of the participant positions.

15. A method in accordance with claim 11, wherein the step of adjusting the cameras comprises discontinuing a transmission of images from said first camera to the corresponding display in said second video conference environment prior to providing the video from the third video conference environment to that display in the second video conference environment.

16. A computer program comprising machine readable program code, recorded on a non-transitory medium, for remote presence video conference environments having a plurality of participant positions, cameras, and displays, wherein each camera in a first remote presence video conference environment corresponds to a display in a second remote presence video conference environment, said program code causing said remote presence video conference environments to:
adjusting the cameras and displays in first and second remote presence video conference environments to view and display opposing participant positions except on an unused display in each environment; and
providing video from a third video conference environment to an unused video display in each of said first and second remote presence video conference environments, each said unused video display corresponding to an unused camera in the other of said first and second remote presence video conference environments.

17. A computer program in accordance with claim 16, further comprising program code for causing the video conference environments to perform the step of providing images to a display in the third environment from an unused camera in at least one of the first and second remote presence video conference environments.

18. A computer program in accordance with claim 17, further comprising program code for causing the video conference environments to perform the step of providing images to the display in the third environment comprises providing a composite of images from all operating cameras in the first and second remote presence video conference environments.

19. A computer program in accordance with claim 16, further comprising program code for causing the video conference environments to perform the step of adjusting the cameras and displays in the first and second remote presence video conference environments comprises adjusting the cameras to view less than all of the participant positions.

20. A computer program in accordance with claim 16, further comprising program code for causing the video conference environments to perform the step of adjusting the cameras and displays in the first and second remote presence video conference environments comprises adjusting less than all of cameras to view all of the participant positions.

21. A method in accordance with claim 11, wherein said first camera is a middle camera between two other cameras.

22. A video conference system, comprising:
first and second remote presence video conference environments, each including a plurality of cameras oriented to view a plurality of participant positions, and a plurality of displays, wherein each camera in each environment corresponds to a display device in the other of said first and second video conference environments;
said video conference system to adjust the cameras and displays in first and second remote presence video conference environments to view and display opposing participant positions except on an unused display in each environment; and said video conference system to provide video from a third video conference environment to an unused video display in each of said first and second remote presence video conference environments, each said unused video display corresponding to an unused camera in the other of said first and second remote presence video conference environments.

* * * * *